(12) United States Patent
Bonk et al.

(10) Patent No.: US 11,118,391 B2
(45) Date of Patent: Sep. 14, 2021

(54) CARRIER MEMBER FOR A VEHICLE WINDOW LIFTER

(71) Applicant: BROSE FAHRZEUGTEILE GMBH & CO. KOMMANDITGESELLSCHAFT, BAMBERG, Bamberg (DE)

(72) Inventors: Andy Bonk, Roedental (DE); Stephan Voelker, Coburg (DE); Udo Taubmann, Bad Rodach-Suelzfeld (DE); Thomas Starklauf, Eggolsheim (DE); Marcel Amft, Hallstadt (DE)

(73) Assignee: BROSE FAHRZEUGTEILE GMBH & CO. KOMMANDITGESELLSCHAFT, BAMBERG, Bamberg (DE)

( * ) Notice: Subject to any disclaimer, the term of this patent is extended or adjusted under 35 U.S.C. 154(b) by 32 days.

(21) Appl. No.: 16/192,086

(22) Filed: Nov. 15, 2018

(65) Prior Publication Data
US 2019/0162004 A1 May 30, 2019

(30) Foreign Application Priority Data

Nov. 17, 2017 (DE) .......................... 102017220617.9

(51) Int. Cl.
*E05F 11/48* (2006.01)
*E05F 11/38* (2006.01)
(Continued)

(52) U.S. Cl.
CPC ............ *E05F 11/483* (2013.01); *E05D 15/16* (2013.01); *E05D 15/165* (2013.01); *E05F 7/04* (2013.01); *E05F 11/385* (2013.01); *B60J 1/17* (2013.01); *E05Y 2201/612* (2013.01); *E05Y 2201/654* (2013.01); *E05Y 2201/66* (2013.01); *E05Y 2201/684* (2013.01); *E05Y 2201/708* (2013.01); *E05Y 2800/292* (2013.01); *E05Y 2800/296* (2013.01); *E05Y 2800/412* (2013.01); *E05Y 2900/55* (2013.01)

(58) Field of Classification Search
CPC ............ E05F 7/04; E05F 11/483; E05F 11/48
See application file for complete search history.

(56) References Cited

U.S. PATENT DOCUMENTS 4,381,140 A * 4/1983 van der Hoek ...... G02B 6/4407
385/104
8,556,234 B2 * 10/2013 Hartman .................. A62B 1/08
182/10

(Continued)

FOREIGN PATENT DOCUMENTS

CN 203755879 U 8/2014
CN 203808709 U 9/2014

(Continued)

*Primary Examiner* — Gregory J Strimbu
(74) *Attorney, Agent, or Firm* — Brooks Kushman P.C.

(57) ABSTRACT

A carrier for a vehicle window lifter configured to be connected to a window pane and adjusted by the vehicle window lifter. The carrier including a guide for a cable of the vehicle window lifter. The guide forms a guide surface and the cable lies along the guide surface when the vehicle window lifter is properly mounted. The guide surface defines at least one cutout configured to receive discharged particles from the guide surface of the carrier.

18 Claims, 6 Drawing Sheets

(51) Int. Cl.
*E05F 7/04* (2006.01)
*E05D 15/16* (2006.01)
*B60J 1/17* (2006.01)

(56) References Cited

U.S. PATENT DOCUMENTS

| | | | | |
|---|---|---|---|---|
| 8,881,457 | B2* | 11/2014 | Matsushita | E05F 11/483 |
| | | | | 49/352 |
| 2013/0074642 | A1* | 3/2013 | Choi | F16C 1/26 |
| | | | | 74/502.5 |
| 2014/0041303 | A1* | 2/2014 | Broadhead | B60J 5/0402 |
| | | | | 49/349 |
| 2017/0292312 | A1 | 10/2017 | Yokoyama et al. | |
| 2018/0347253 | A1* | 12/2018 | Gokan | E05F 15/655 |
| 2019/0136599 | A1* | 5/2019 | Kinoshita | E05F 11/488 |

FOREIGN PATENT DOCUMENTS

| | | |
|---|---|---|
| CN | 204552416 U | 8/2015 |
| CN | 204782483 U | 11/2015 |
| DE | 19619057 A1 | 11/1997 |
| DE | 20202352 U1 | 5/2002 |
| DE | 10220948 A1 | 11/2003 |
| DE | 202006013425 U1 | 1/2008 |
| DE | 102009053812 A1 | 2/2011 |
| JP | 2008006914 A | 1/2008 |

* cited by examiner

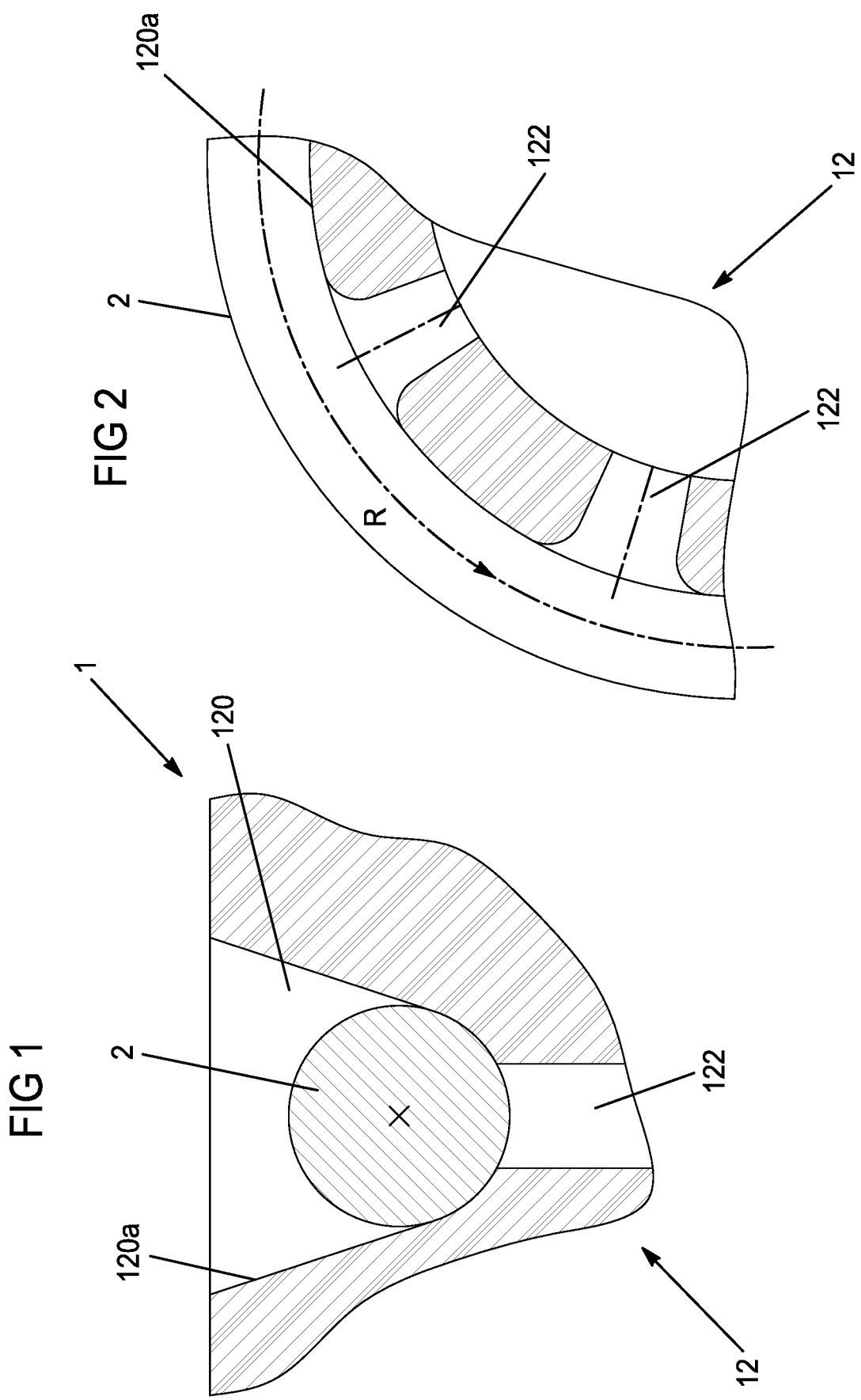

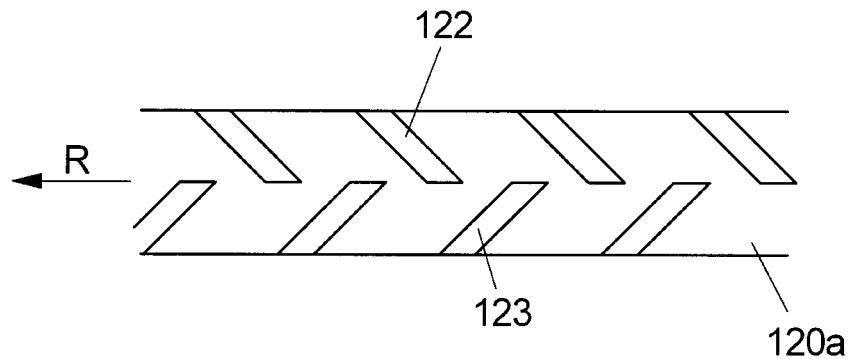
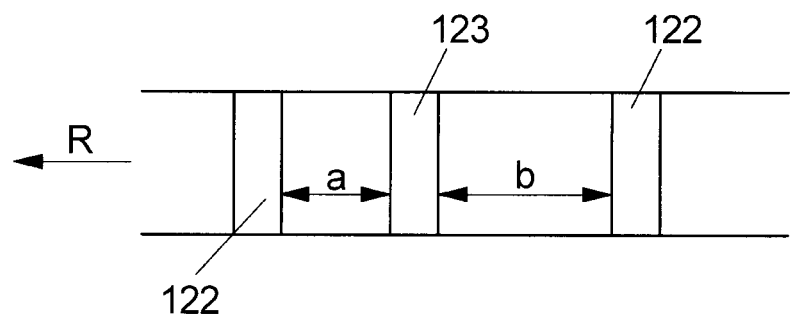
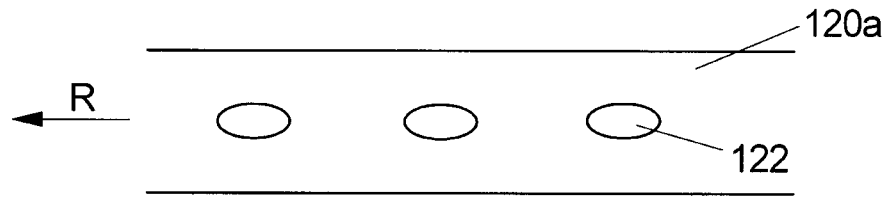
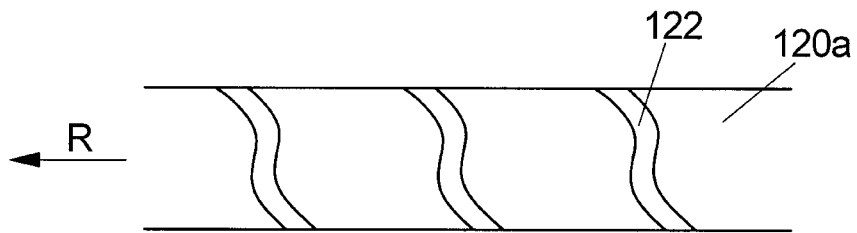

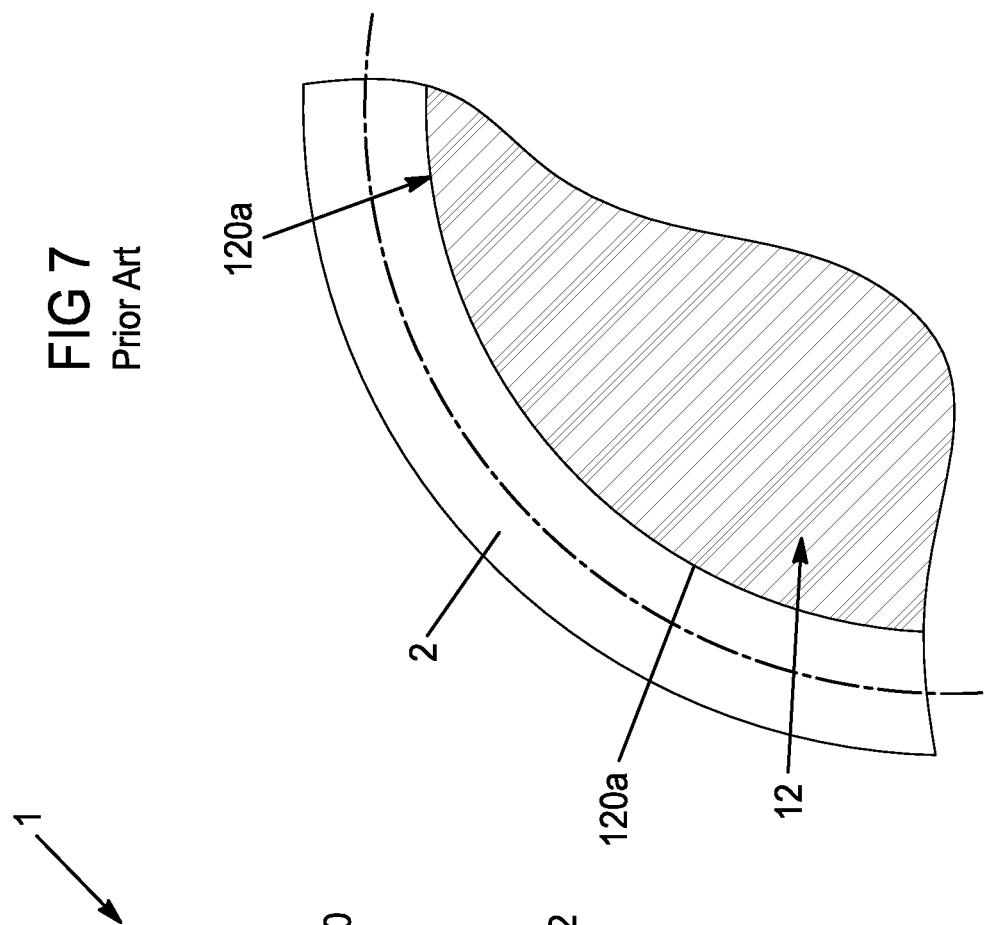
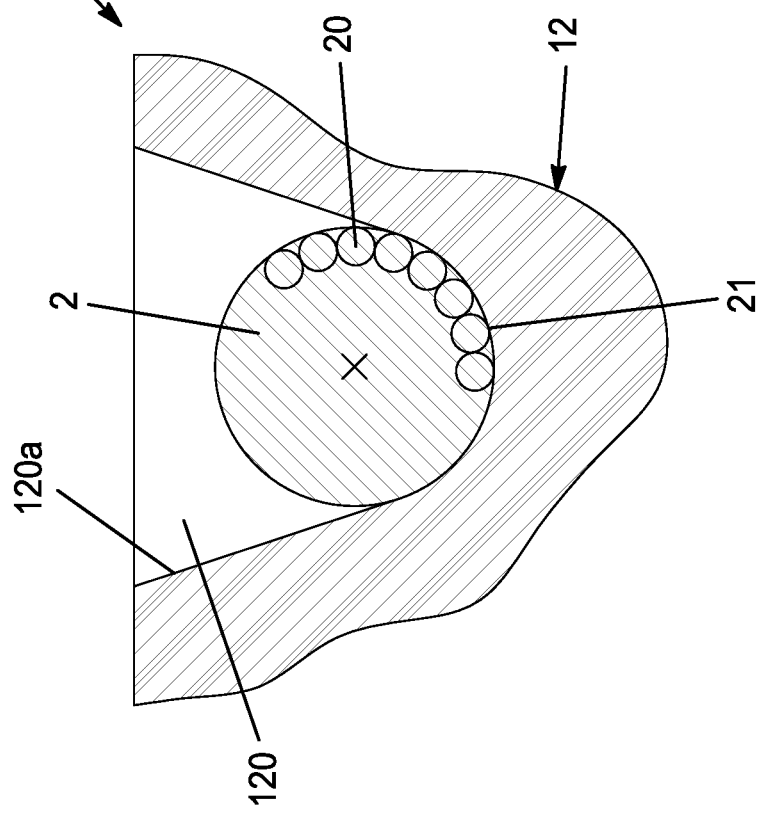

CARRIER MEMBER FOR A VEHICLE WINDOW LIFTER

CROSS-REFERENCE TO RELATED APPLICATIONS

This application claims priority to German Patent Application No. 10 2017 220 617.9 filed on Nov. 17, 2017, the entirety of which is incorporated by reference herein.

BACKGROUND

This disclosure relates to a carrier for a vehicle window lifter and to a vehicle window lifter with a carrier for the adjustment of a window pane.

Vehicle window lifters, which for the adjustment of a window pane are equipped with a flexible traction means for the transmission of an adjusting force and at least one carrier to be connected to the window pane and adjustable by means of the traction means, are widely known. The carrier for example is shiftably guided on a guide rail that is attached to a carrier component or is integrally molded thereto. In this connection it is also known to design a carrier, which possibly is also referred to as slider, with a guide for the deflection of the flexible traction means of the vehicle window lifter in order to increase a maximum lifting length of the vehicle window lifter. Then, for example, the flexible traction means is deflected on the carrier by more than 45°, for example by 90°. In such vehicle window lifters the flexible traction means, for example in the form of a cable that is connected to the carrier in order to be able to adjust the same along two mutually opposite adjustment directions thus is deflected on the carrier on a guide of the carrier provided for this purpose, for example by about 90°, in order to increase the maximum lifting length of the vehicle window lifter and hence to increase the possible lift for the window pane to be adjusted.

Such a guide of the carrier then forms a guide surface against which the traction means (rubbingly) rests when the vehicle window lifter is properly mounted. In operation of the vehicle window lifter undesired rubbing or grinding noises can be obtained due to the driving abutment of the traction means against the guide surface deflecting the traction means. To avoid such disturbing noises it is already known from practice to lubricate, e.g. to grease, a guide of the carrier for the flexible traction means.

It has now been found that the previously known measures to avoid disturbing rubbing or grinding noises represent a lasting improvement at best to a limited extent. Even in carriers lubricated on the guide, friction surfaces possibly are formed between the traction means and the guide surface of the carrier in continuous operation of the vehicle window lifter, which furthermore involve disturbing rubbing or grinding noises. Thus, dirt or dust particles and particles produced by abrasion frequently get into the guide for the flexible traction means. In combination with possible oils or fats provided to reduce the friction such particles mix to obtain a kind of abrasive paste within the guide. Due to the relative movement of the flexible traction means with respect to the guide of the carrier, via which the flexible traction means is deflected on the carrier, undesired rubbing or grinding noises likewise are obtained in operation of the vehicle window lifter.

SUMMARY

Hence, a solution is required that overcomes or at least reduces the disadvantages set forth above.

This is achieved both with a carrier having features as described herein and with a vehicle window lifter having features as described herein.

A carrier for a vehicle window lifter according to one or more embodiments, which is to be connected to a window pane to be adjusted by means of the vehicle window lifter (i.e. is equipped and provided for the connection with such a window pane) and which includes a guide for the deflection of a traction means of the vehicle window lifter, forms a guide surface on the guide for the traction means, against which the traction means rests when the vehicle window lifter is properly mounted. Thus, the traction means here slides along the guide surface of the carrier with at least one portion when the window pane is adjusted by means of the carrier. It now is provided that at least one cutout is formed on the guide surface for discharging particles from the guide of the carrier provided for the traction means. Via the at least one cutout on the guide surface (in a region against which the traction means rests in operation of the vehicle window lifter), particles that get into the guide of the carrier for example by abrasion or an external influence (e.g. due to dust, dirt, salt, water, cleaning agent, etc.) can again be discharged from the guide. Possibly present particles can automatically be transported to the at least one cutout and via the same be discharged from the guide by means of the traction means, which in operation of the vehicle window lifter is moved to adjust the window pane. Via the at least one cutout an accumulation of particles on the guide surface of the carrier thus is prevented.

As already explained above, the flexible traction means can be deflected on the carrier by more than 45°, for example by 90°. The flexible traction means, for example in the form of a cable that is connected to the carrier in order to be able to adjust the same along two mutually opposite adjustment directions thus is deflected on the carrier on a guide of the carrier provided for this purpose, for example by about 90°, in order to increase the possible lift for the window pane to be adjusted.

The at least one cutout for example can form a depression in the guide surface. For example, this includes the fact that there is provided an area set back with respect to the guide surface for the traction means, in which disturbing particles can be received so that the same cannot accumulate on the guide surface itself.

Alternatively or in addition, the at least one cutout can form a through opening. Thus, this for example includes the fact that at least one through opening is formed on the guide surface for discharging particles from the guide of the carrier provided for the traction means. In operation of the vehicle window lifter, particles thus can permanently be removed from the guide in a simple way via a corresponding through opening.

The at least one cutout for example can be configured as a simple hole, in particular as a drilled hole or perforation hole, in the guide surface of the carrier.

In one design variant the at least one cutout is configured to be longitudinally extended. For example, this includes the fact that the cutout extends on the guide surface like a channel or slot. A longitudinal axis of the at least one longitudinally extended cutout here can then extend for example parallel, obliquely or transversely to a direction of longitudinal extension of the guide.

In one design variant the at least one cutout has a circular or elliptical cross-section. Here, the cutout is configured for example as a circular cylindrical through opening on the guide surface.

In one design variant the cutout includes a first portion and at least one second portion, wherein the at least one second portion adjoins the first portion in one direction and the second portion flares along exactly this direction. For example, this includes a design variant in which the cutout is designed longitudinally extended, extends substantially transversely to a direction of longitudinal extension of the guide and flares towards the outside (or also to the inside). A corresponding flare and hence local increase of the cutout here in particular can take account of an accumulation of particles in certain areas of the guide which is to be expected in operation of the vehicle window lifter.

In one design variant the at least one cutout extends in an S-shape along the guide surface. At this point reference should expressly be made to the fact that an S-shaped extension of the at least one cutout does not exclude that the cutout comprises at least one flared portion for the discharge of particles.

In one design variant, a plurality of cutouts succeeding each other along a direction of longitudinal extension of the guide are formed on the guide surface. Providing a plurality of cutouts on the guide surface of the guide of the carrier provided for the deflection of the traction means facilitates the discharge also of larger amounts of particles in operation of a vehicle window lifter equipped with the carrier.

The individual cutouts succeeding each other can of course be designed corresponding to the design variants explained above and can also be differently combined with each other. In particular, combinations with depressions and through openings and/or with cutouts extending differently with respect to the direction of longitudinal extension of the guide can be provided.

For example, at least one cutout extending parallel to the direction of longitudinal extension of the guide can be combined with a plurality of cutouts extending obliquely to the direction of longitudinal extension. In a development based thereon a central cutout extending parallel to the direction of longitudinal extension of the guide for example extends centrally between two rows of cutouts each oriented obliquely to the direction of longitudinal extension.

In one design variant it is provided for example that at least two of the plurality of cutouts succeeding each other along the direction of longitudinal extension of the guide have different cross-sectional shapes.

Alternatively or in addition, the plurality of cutouts succeeding each other along the direction of longitudinal extension of the guide can be spaced apart from each other equidistantly or be provided with mutually different spacings.

In one design variant at least two of the plurality of cutouts succeeding each other along the direction of longitudinal extension of the guide can (also) be offset from each other transversely to the direction of longitudinal extension.

Thus, in particular different arrangements of cutouts, in particular in the form of through openings, can be formed on the guide surface of the carrier in order to support a discharge of particles from the guide. In principle, the guide on the carrier can be designed for example as a guide channel in which the guide surface for the (flexible) traction means, for example a cable, is formed by an inner shell surface of this guide channel.

Another aspect of the proposed solution relates to a vehicle window lifter for the adjustment of a window pane. Such a vehicle window lifter comprises a flexible traction means for the transmission of an adjusting force for the adjustment of the window pane, at least one carrier to be connected to the window pane, and at least one guide rail on which the at least one carrier is shiftably guided. The carrier includes a guide for the deflection of the flexible traction means on the carrier, wherein the guide forms a guide surface against which the flexible traction means rests. Furthermore, at least one cutout now is formed on the guide surface for discharging particles from the guide of the carrier provided for the flexible traction means.

Thus, a guide provided for the deflection of the traction means on the carrier, for example for a deflection in the range of 90°, here integrates at least one cutout via which particles otherwise leading to rubbing or grinding noises in operation of the vehicle window lifter can be discharged from the guide. A corresponding vehicle window lifter thus can include a carrier corresponding to the design variants explained above. Correspondingly, advantages and features explained above and below for such a carrier also apply for design variants of a corresponding vehicle window lifter, and vice versa.

BRIEF DESCRIPTION OF THE DRAWINGS

The attached Figures by way of example illustrate possible design variants of the proposed solution.

FIG. 1 in a cross-section and sectionally shows an exemplary embodiment of a carrier with a view to a channel-shaped (cable) guide and a cutout formed on a guide surface of this guide in the form of a through opening for discharging particles.

FIG. 2 sectionally shows the carrier of FIG. 1 in a longitudinal section by illustrating a plurality of through openings succeeding each other along a direction of longitudinal extension of the guide and a cable deflected therein by 90°.

FIGS. 3A to 3I sectionally and each in a top view show further variants for the guide surface of the carrier provided with at least one cutout.

FIG. 6 sectionally and in a sectional view corresponding to FIG. 1 shows a guide according to the prior art formed on a carrier.

FIG. 7 in a view corresponding with FIG. 2 sectionally shows the carrier of FIG. 6.

DETAILED DESCRIPTION

Figure 4:
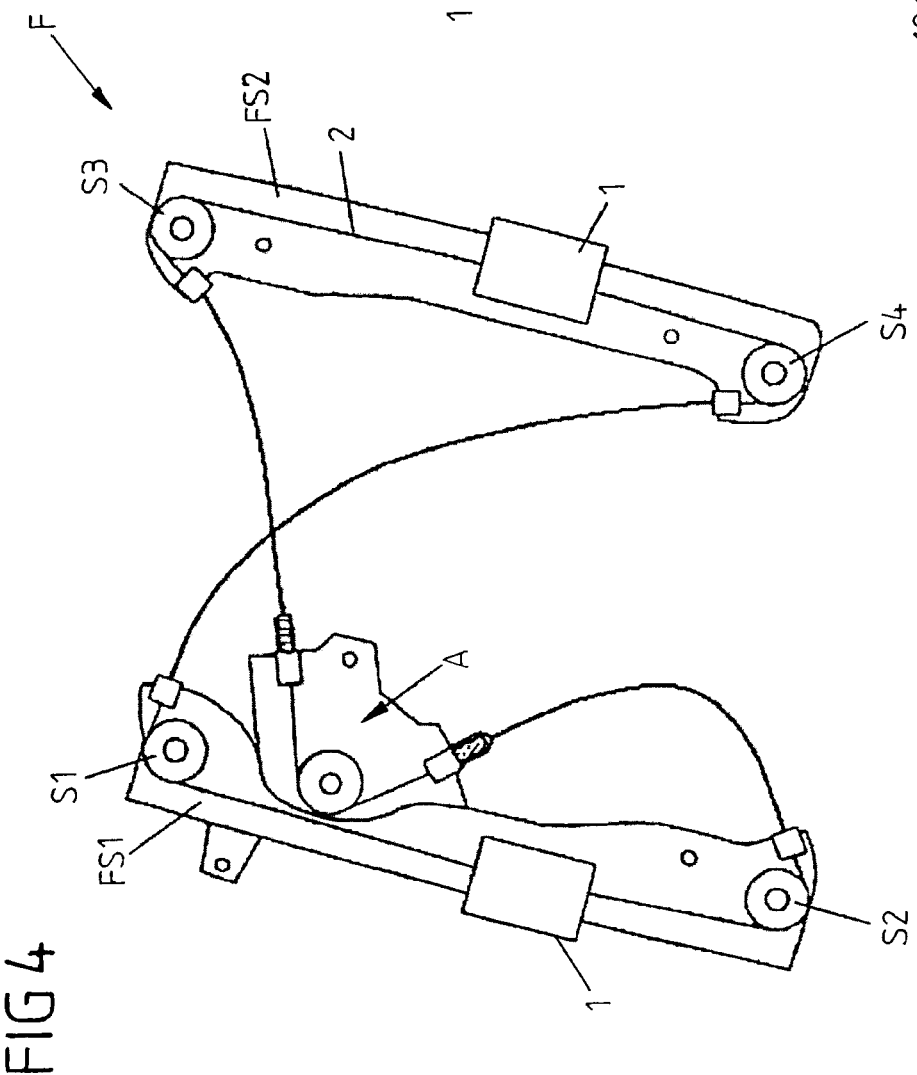
FIG. 4 shows a side view of a vehicle window lifter with two carriers each shiftably mounted on a guide rail.

FIG. 4 shows a side view of a usual construction of a vehicle window lifter F for the adjustment of a non-illustrated window pane in a vehicle. The vehicle window lifter F here includes two guide rails FS1 and FS2 oriented substantially parallel to each other. On each of these guide rails FS1 and FS2 a carrier 1 is shiftably mounted. Each carrier 1 is connected to a cable 2 of the vehicle window lifter F that is deflected via a plurality of deflection elements in the form of cable pulleys S1 to S4. The cable pulleys S1 to S4 each are rotatably mounted on an upper and a lower end of the guide rails FS1 and FS2.

The cable 2 furthermore is connected with a drive unit A of the vehicle window lifter F. This drive unit A usually comprises a drive motor and a cable drum driven thereby, on which a portion of the cable 2 can be wound up and unwound in order to transmit an adjusting force to the carriers 1 by means of the cable 2 for lifting or lowering the window pane. Depending on the direction of rotation of the drive motor of the drive unit A, the two carriers 1 are synchronously adjusted along the guide rails FS1 and FS2 in one of two possible adjustment directions opposite to each other so that the window pane connected to the two carriers 1 thereby can be lifted or lowered.

Figure 5:
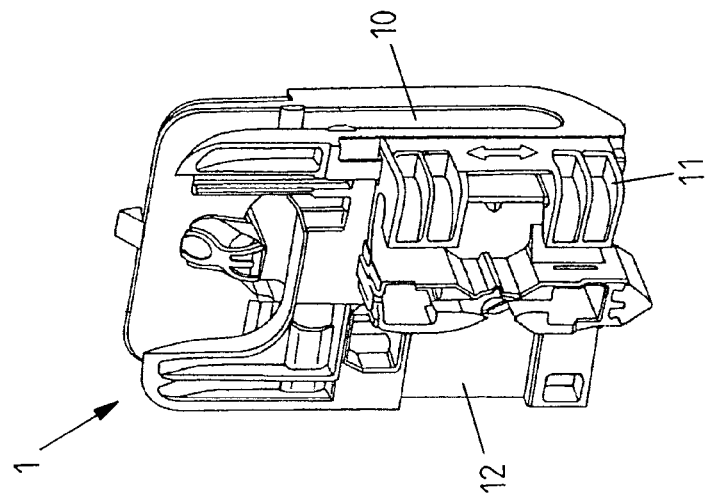
FIG. 5 shows a perspective view of a carrier known from the prior art.

With reference to FIG. 5 a carrier 1 known from the prior art by way of example is illustrated in detail in a perspective view. The carrier 1 among other things comprises a pane attachment portion 10 via which the carrier 1 can be fixed on a pane lower edge of the window pane. Furthermore, the carrier 1 comprises a guide portion 11. Via this guide portion 11 a portion on the respective guide rail FS1, FS2 can be embraced, so that the carrier 1 is shiftably held at the respective guide rail FS1 or FS2. Furthermore, the carrier 1 comprises a base body 12. To this base body 12 the pane attachment portion 10 and the guide portion 11 can be molded or attached. Furthermore, a connecting point for the connection of the cable 2 to the carrier 1 is formed on the base body 12. A corresponding connecting point for example is formed by at least one nipple chamber into which a cable nipple of the cable 2 can be hung.

From the prior art it now is furthermore known that on a base body 12 of a carrier 1 a guide can be formed for the deflection of a flexible traction means, such as the cable 2, in order to increase the maximum possible lift of the window pane. Typically, a cable 2 is deflected on the carrier 1 in the range of 90°. A corresponding carrier 1 known from the prior art is sectionally shown in FIGS. 6 and 7 in a cross-section and in a longitudinal section.

The cable 2 is guided in a channel-shaped cable guide 120 of the base body 12 of the carrier 1. In this region, the cable 2 hence rests against a shell or guide surface 120a of the cable guide 120 designed as a cable channel. In operation of the vehicle window lifter F a relative movement occurs between the cable 2 and the guide surface 120a along which the cable 2 is deflected on the carrier 1. The friction pairing between cable 2 and guide surface 120a thus can lead to disturbing rubbing or grinding noises.

To avoid such disturbing noises it is already known to lubricate, e.g. to grease, the guide 120 on the carrier 1. A corresponding lubricant then for example gets into spaces 21 that are present between wire strands 20 of the cable 2. In operation of the vehicle window lifter F it can occur, however, that particles, in particular dust or dirt particles, get into the guide 120 and in particular between the cable 2 and the guide surface 120a from outside or due to abrasion. Together with the lubricant these particles then form an abrasive paste which in operation likewise leads to disturbing rubbing or grinding noises.

This can be remedied by the proposed solution for which possible design variants are shown in FIGS. 1 to 3K.

On the guide surface 120a of the carrier 1 at least one cutout 122 is formed, via which particles can be discharged from the guide 120 provided for the cable 2. Via the at least one cutout 122, particles that possibly have got into the guide 120 can be removed (automatically by movement of the cable 2 in the guide 120).

FIGS. 1 and 2 for example in views corresponding with FIGS. 6 and 7 sectionally show a carrier 1 in which along a direction of longitudinal extension R of the guide 120, which corresponds to the direction of extension of the cable 2 deflected on the carrier 1, a plurality of (at least two) cutouts 122 succeeding each other and each designed as through openings are formed on the guide surface 120a. Via these through openings or holes of the cutouts 122 particles can be discharged from the cable guide 120. The cutouts 122 extend substantially perpendicularly to the direction of longitudinal extension R of the cable guide 120. For example, the individual cutouts 122 are formed by perforations on the base body 12 of the carrier.

Since particles possibly present in the guide 120 can get out of the guide 120 via the cutouts 122, their accumulation on the guide surface 120a is prevented. Hence, no mixing of these particles with liquids, oils or fats possibly present within the guide 120 can occur. Thus, an abrasive paste disadvantageous for the generation of rubbing or grinding noises cannot be produced.

Figure 3A:
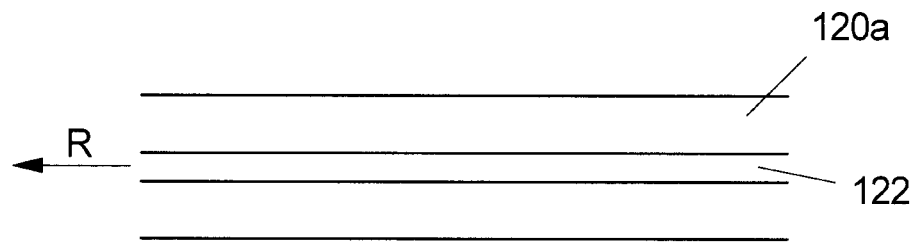
Figure 3B:
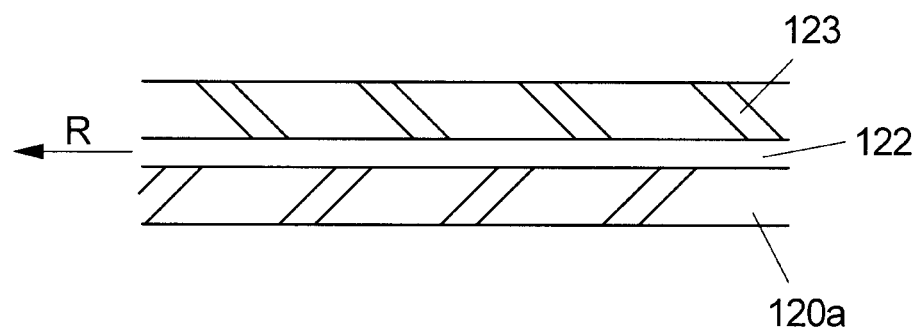

Instead of individual local cutouts 122 in the form of through openings or through holes, a longitudinally extended channel-like or slot-like cutout 122 extending centrally at the bottom of the cable guide 120 for example can also be provided corresponding to the top view of FIG. 3A in order to discharge particles from the cable guide 120. This longitudinally extended channel-like or slot-like cutout 122 here extends e.g. parallel to the direction of longitudinal extension R of the cable guide 120.

Cutouts 122 and 123 of different geometrical design also can be combined with each other. In the design variant of FIG. 3B for example the channel-like cutout 122 of FIG. 3A is combined with cutouts 123 extending obliquely to the direction of longitudinal extension R and mirror-symmetrical to each other. The obliquely extending cutouts 123 arranged on both sides of the centrally extending, channel-like cutout 122 thus extend laterally of the cable 2, when the same is properly deflected on the carrier 1, and converge towards each other.

Figure 3C:
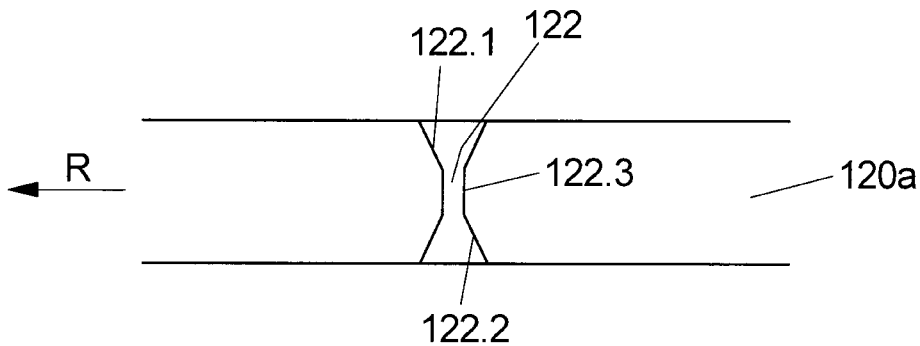

A cutout 122 on the guide surface 120a corresponding to the design variant of FIG. 3C on the other hand extends substantially transversely to the direction of longitudinal extension R. The cutout 122 of FIG. 3C here includes a central portion 122.3 which on both sides is each adjoined by a further portion 122.1, 122.2 towards the outside. These (edge) portions 122.1 and 122.2 flare towards the outside and thus permit the exit of larger particles as well as larger amounts of particles in an edge-side region of the guide 120.

Figure 3D:
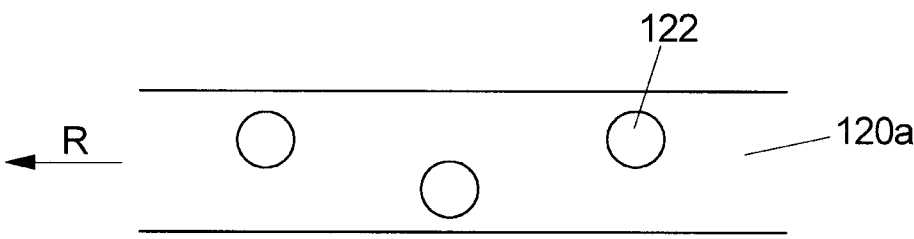

In the design variant of FIG. 3D a plurality of cutouts 122 each with a circular cross-section are provided, which are arranged one behind the other along the direction of longitudinal extension R. Immediately successive cutouts 122 additionally are offset from each other transversely to the direction of longitudinal extension R.

In the design variant of FIG. 3E two mutually opposite rows of cutouts 122 and 123 each extending obliquely to the direction of longitudinal extension R are formed on the guide surface 120a. The rows of the cutouts 122 and 123 are provided laterally within the guide 120 and each extend obliquely to the direction of longitudinal extension R inwards or downwards in the cable guide 120.

In the design variant of FIG. 3F slot-like cutouts 122 extending transversely to the direction of longitudinal extension R each are formed on the guide surface 120a, which have mutually different spacings a and b.

In the design variant of FIG. 3G a plurality of cutouts 122 each with an elliptical cross-section are arranged one behind the other along the direction of longitudinal extension R.

In the design variant of FIG. 3H individual cutouts 122 arranged one behind the other each extend in an S-shape.

Figure 3I:
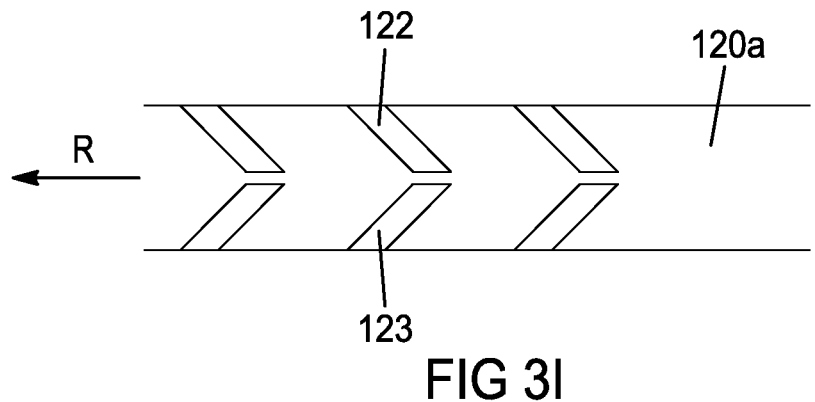

In the design variant of FIG. 3I in correspondence with the design variant of FIG. 3E mutually opposite rows of cutouts 122 and 123 are formed on the guide surface 120a, wherein the respective cutouts 122 and 123 of a row each extend obliquely to the direction of longitudinal extension R. In contrast to the design variant of FIG. 3E, the cutouts 122 and 123 here are formed on the base body 12 (usually made of plastics) by means of a 2-component injection molding method.

Figure 3J:
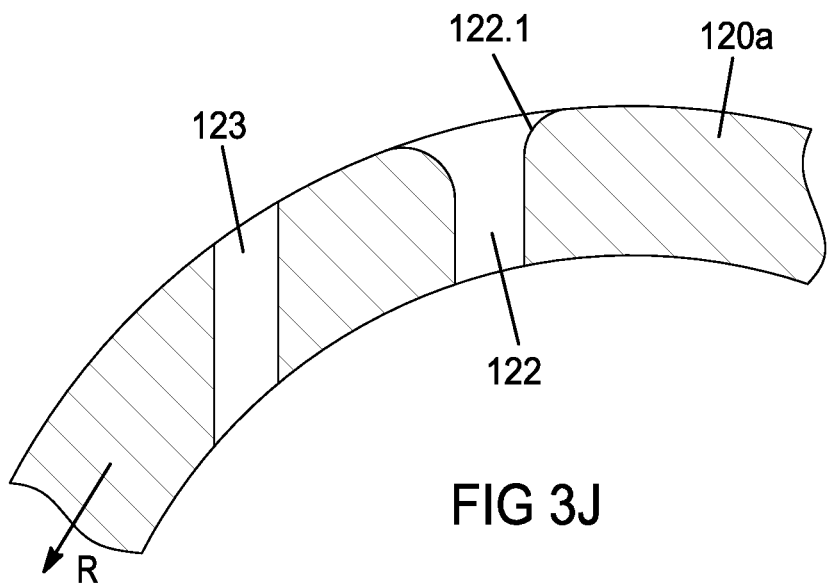
FIG. 3J to 3K sectionally and each in a longitudinal section show further variants for cutouts formed on the guide surface.
Figure 3K:
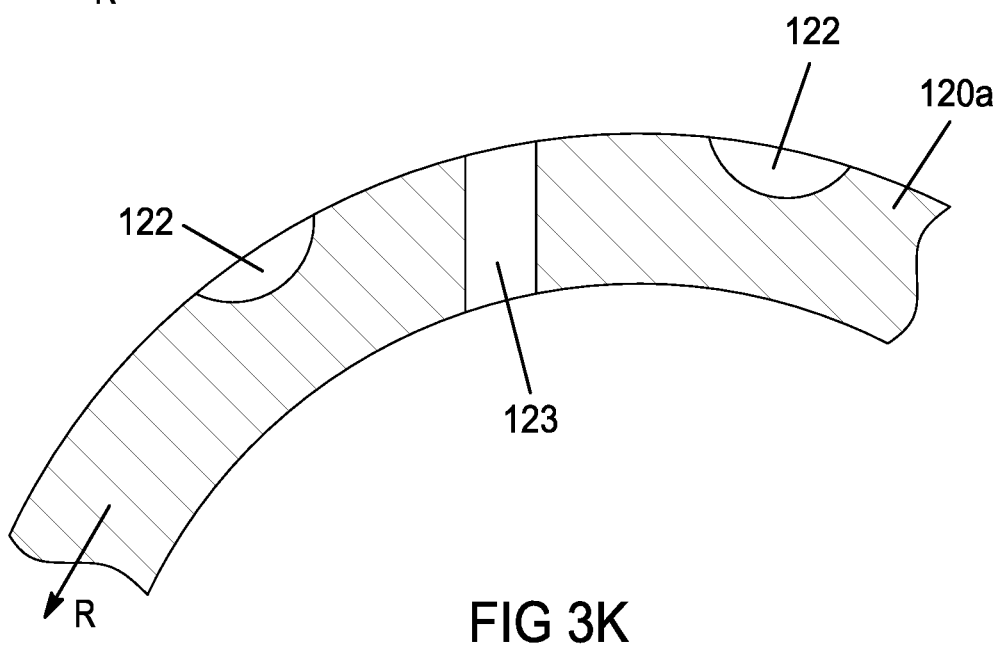

FIGS. 3J and 3K furthermore illustrate the possibility of combining cutouts 122 and 123 of different geometrical design with each other on the guide surface 120a of the carrier 1 provided for the deflection of the cable 2. FIG. 3J for example provides a cutout 122 with a funnel-shaped flared edge portion 122.1. In addition, a cutout 122 corresponding to FIG. 1, 2 or 3F is provided. In the design variant of FIG. 3K elliptical cutouts 122 as well as cutouts 123 that are longitudinally extended and extend transversely to the direction of longitudinal extension R in turn are combined with each other.

Instead of or in addition to cutouts 122, 123 that are configured as through openings or through holes on the cable guide 120 cutouts can of course also be configured as depressions in the guide surface 120a. Such depressions in particular can border a through opening. In this way, particles for example can first accumulate in the depression and can then be completely moved out of the guide 120—by succeeding particles—via the through opening.

In principle, the individual cutouts 122 and 123 are provided on those areas of the guide surface 120 against which the cable 2 rests in operation of the vehicle window lifter F. In operation of the vehicle window lifter the cable 2 thus extends beyond the respective cutouts 122 and 123 and hence due to its relative movement on the carrier 1 moves particles from the cable guide 120 to the cutouts 122, 123 and hence out of the guide 120. Particles possibly introduced into the cable guide 120 due to abrasion or an external influence hence are guided out of the channel-like cable guide 120 at defined cutouts 122 and 123 so that no disturbing rubbing or grinding noises are caused thereby.

LIST OF REFERENCE NUMERALS 1 carrier
10 pane attachment portion
11 guide portion
12 base body
120 cable guide (guide)
120a shell/guide surface
122, 123 cutout
122.1, 122.2 edge portion
122.3 central portion
2 cable (traction means)
20 wire strands
21 space
A drive unit
a, b spacing
F vehicle window lifter
FS1, FS2 guide rail (guide)
R direction of longitudinal extension
S1-S4 cable pulley (deflection element)

The invention claimed is:

1. A vehicle window lifter for adjusting a window pane comprising:
a cable extending along a direction of extension;
a guide rail; and
a carrier configured to move the window pane along the guide rail, wherein the carrier includes a body that includes a receptacle extending along the direction of extension, wherein an inner surface of the receptacle defines a guide surface, wherein the guide surface has a plurality of cutouts therein, wherein the cable is movable relative to the guide surface and engages the guide surface over at least a portion of the guide surface that includes the cutouts such that discharged particles created by relative movement between the cable and the guide surface are receivable within the cutouts, and wherein the cutouts are arranged one behind another along the direction of extension.

2. The vehicle window lifter of claim 1, wherein at least one cutout of the plurality of cutouts is a through hole in the guide surface.

3. The vehicle window lifter of claim 1, wherein first and second cutouts of the plurality of cutouts are slanted relative to each other to form a V-shape.

4. The vehicle window lifter of claim 2, wherein the direction of extension includes a curved portion and a straight portion.

5. The vehicle window lifter of claim 1, wherein at least one cutout of the plurality of cutouts is a depression in the guide surface.

6. A carrier for use with a vehicle window lifter, the carrier comprising:
a body slidable along a guide rail of the window lifter, the body including a receptacle that receives a cable extending along a direction of extension, wherein the receptacle has a guide surface that extends along the direction of extension and that has a plurality of cutouts therein, wherein the cutouts are arranged one behind the other along the direction of extension, wherein the cable is movable relative to the guide surface and engages the guide surface over at least a portion of the guide surface that includes the cutouts, wherein the cutouts are configured to receive discharged particles created by relative movement between the cable and the guide surface to remove the discharged particles from the guide surface.

7. The carrier of claim 6, wherein at least one cutout of the plurality of cutouts is formed by a depression in the guide surface.

8. The carrier of claim 6, wherein at least one cutout of the plurality of cutouts is formed by a through opening in the guide surface.

9. The carrier of claim 6, wherein at least one cutout of the plurality of cutouts is circular.

10. The carrier of claim 6, wherein at least one cutout of the plurality of cutouts includes a first portion, extending from the guide surface, and a second portion extending from the first portion, and wherein the first portion is flared with respect to the second portion.

11. The carrier of claim 6, wherein at least one cutout of the plurality of cutouts is S-shaped.

12. The carrier of claim 6, wherein the cutouts include a first cutout, a second cutout, and a third cutout, wherein the first cutout is spaced apart from the second cutout by a first distance and wherein the second cutout is spaced apart from the third cutout by a second distance, and wherein the first and second distances are same.

13. The carrier of claim 12, wherein the first cutout and the second cutout are offset from one another with respect to the direction of extension.

14. The carrier of claim 6, wherein the direction of extension includes a curved portion and a straight portion.

15. A vehicle window lifter for adjusting a window pane comprising:
a cable;
a guide rail; and
a carrier configured to move the window pane along the guide rail, wherein the carrier includes a guide that receives the cable, wherein the guide has a guide surface that extends along a direction of extension of the cable, the guide surface has a first cutout, a second cutout, and a third cutout therein, wherein the cutouts are arranged with respect to one another along the direction of extension with the first cutout spaced apart from the second cutout by a first distance and with the second cutout spaced apart from the third cutout by a second distance that is greater than the first distance, wherein the cable is movable relative to the guide surface and engages the guide surface over at least a portion of the guide surface that includes the cutouts such that discharged particles created by movement of the cable with respect the guide surface are receivable in the cutouts.

16. The vehicle window lifter of claim 15, wherein the first cutout is a formed by a depression in the guide surface.

17. The vehicle window lifter of claim 15, wherein the second cutout is formed by a through opening in the guide surface.

18. The vehicle window lifter of claim 15, wherein the second cutout includes a first portion and a second portion, and wherein the first portion is flared with respect to the second portion.

* * * * *